(12) United States Patent
Lockhart

(10) Patent No.: US 12,035,796 B1
(45) Date of Patent: Jul. 16, 2024

(54) AUTOMATIC COSMETIC CONTAINER AND METHOD OF USE

(71) Applicant: Mia Lockhart, Lancaster, TX (US)

(72) Inventor: Mia Lockhart, Lancaster, TX (US)

( * ) Notice: Subject to any disclaimer, the term of this patent is extended or adjusted under 35 U.S.C. 154(b) by 478 days.

(21) Appl. No.: 17/488,709

(22) Filed: Sep. 29, 2021

(51) Int. Cl.
  *H02J 7/00* (2006.01)
  *A45D 40/22* (2006.01)
  *A45D 40/24* (2006.01)
  *H02P 1/00* (2006.01)

(52) U.S. Cl.
  CPC ........... *A45D 40/24* (2013.01); *A45D 40/222* (2013.01); *H02P 1/00* (2013.01); *A45D 2040/225* (2013.01)

(58) Field of Classification Search
  CPC ....................................................... H02P 1/00
  See application file for complete search history.

(56) References Cited

U.S. PATENT DOCUMENTS

| 2013/0144280 A1* | 6/2013 | Eckhouse | ............... A61B 17/54 606/1 |
| 2017/0054315 A1* | 2/2017 | Chien | ................. F21V 33/0024 |

* cited by examiner

*Primary Examiner* — Muhammad S Islam
(74) *Attorney, Agent, or Firm* — Richard Eldredge; Leavitt Eldredge Law Firm

(57) ABSTRACT

A cosmetic container that provides for touchless opening and closing of said cosmetic container is disclosed. In some embodiments the cosmetic container includes a controller, one or more motion sensors, a power source, a button, a plurality of compartments, a plurality of hinges, and a handle. In alternative embodiments, the cosmetic container includes a casing, a controller, one or more motion sensors, a power source, and a button.

11 Claims, 3 Drawing Sheets

AUTOMATIC COSMETIC CONTAINER AND METHOD OF USE

BACKGROUND

1. Field of the Invention

The present invention relates generally to cosmetic containers, and more specifically to a cosmetic container that utilizes one or more sensors to provide for touchless opening and closing of said cosmetic container.

2. Description of Related Art

Cosmetics are ubiquitous and have been in use for thousands of years. Generally, cosmetics are substances intended to be applied to the human body for cleansing, beautifying, promoting attractiveness, or alternating the appearance. Cosmetics come in a variety of forms (e.g., liquids, creams, gels, powders, waxes, oils, etc.) and are held in various cosmetic containers for easy storage.

Typically, users must open cosmetic containers by hand prior to use. In this manner, however, the cosmetic may be contaminated with various microorganisms on the user's skin. As the user continues to open and close the cosmetic container, more microorganisms are introduced to the cosmetic, leading to potential skin problems, allergies, changes in smell, and the like.

Accordingly, it is an object of the present application to provide a system that enables the user to open and close a cosmetic container and dispense a cosmetic from the cosmetic container handsfree.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
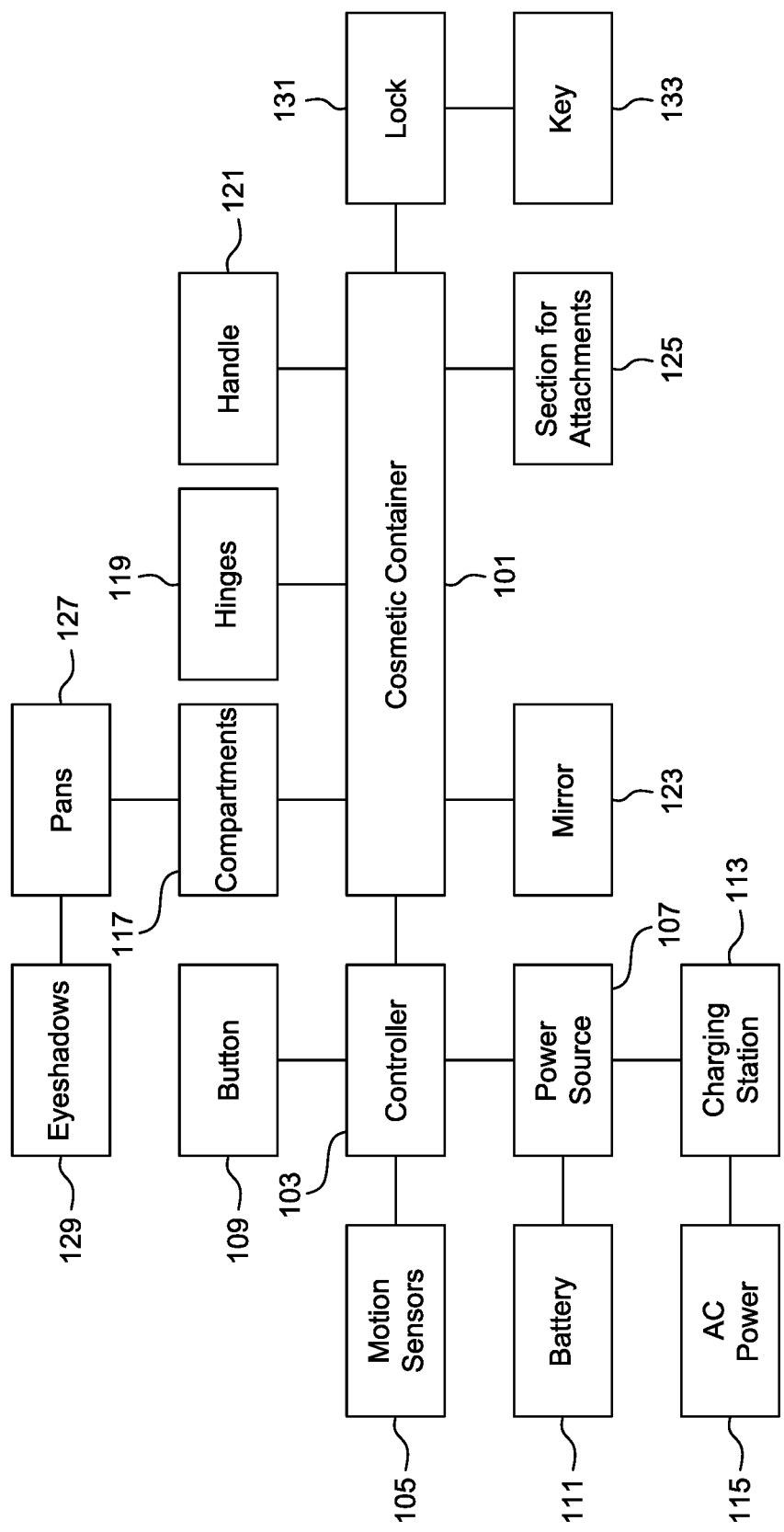
FIG. 1 is a schematic representation of a cosmetic container in accordance with one or more embodiments of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional cosmetic containers. Specifically, the present invention reduces the risk of contamination associated with the handling of cosmetic containers. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic representation of a cosmetic container 101 in accordance with one or more embodiments of the present application. It will be appreciated that the cosmetic container 101 overcomes one or more of the above-listed problems commonly associated with conventional cosmetic containers.

In the contemplated embodiment, the cosmetic container 101 includes a controller 103 in electronic communication with one or more motion sensors 105, a power source 107, and a button 109. The controller 103 is configured to execute code or instructions to perform the operations and functionality described herein and to perform calculations and generate commands. It should be appreciated that the controller 103 can be a general-purpose processor, a microprocessor, a reconfigurable processor, a microcontroller, any other processing unit, or any combination or multiplicity thereof.

The one or more motion sensors 105 can be based on passive infrared technology, ultrasonic technology, microwave technology, tomographic technology, other motion detection technology, or a combination or multiplicity thereof.

The power source 107 is configured to supply electrical energy to the cosmetic container 101. The power source 107 can be a battery 111 that is rechargeable. In addition, the battery 111 can be recharged through a charging station 113 that is in direct connection to an alternating current (AC) power 115. It should be appreciated that the charging station 113 can recharge the battery 111 via a wired connection, wireless connection, or both.

The button 109 is configured to allow the cosmetic container 101 to open and close when a user presses onto the button 109.

The cosmetic container 101 also includes a plurality of compartments 117, a plurality of hinges 119, a handle 121, a mirror 123, and a section for one or more attachments 125. The compartments 111 provide for storage space for multiple cosmetic products such as makeup brushes, hairbrushes, skincare products, lipsticks, makeup products, and the like. In some embodiments, the compartments 111 include a plurality of pans 127 configured to hold a plurality of eyeshadows 129. It should be appreciated that the eyeshadows 129 can be made of base fillers (e.g., mica, talc, kaolin clay, etc.), binders, slip, and preservatives.

The hinges 119 allow the cosmetic container 101 to pivot into an open and closed configuration. In addition, the hinges 119 allow the compartments 117 to pivot into an expansion and collapsible configuration.

The handle 121 provides for easy transportation and handling.

The section for one or more attachments 125 provide for space to receive different attachments such as a ring light clip.

The cosmetic container 101 further includes a lock 131 with a corresponding key 133 to provide for secured closure of the cosmetic container.

It should also be appreciated that the cosmetic container 101 may vary based on aesthetical, functional, or manufacturing considerations. For example, the cosmetic container 101 may have any suitable shape, including rectangular, square, triangular, linear, oval, or other appropriate geometry. In addition, the cosmetic container 101 may be made from any suitable material such as plastics, metals, woods, other materials, or a combination or multiplicity thereof. In another example, the cosmetic container 101 may include different colored materials and/or different colored patterns, images, and the like.

Further, it should also be appreciated that during use, when the cosmetic container 101 is in a closed configuration, a user can activate the one or more sensors 105 by waving their hand thereover which causes the cosmetic container 101 to advance into an open configuration. The user can then activate the one or more sensors 105 again by waiving their hand thereover which causes the cosmetic container 101 to advance back into the closed configuration.

Figure 2:
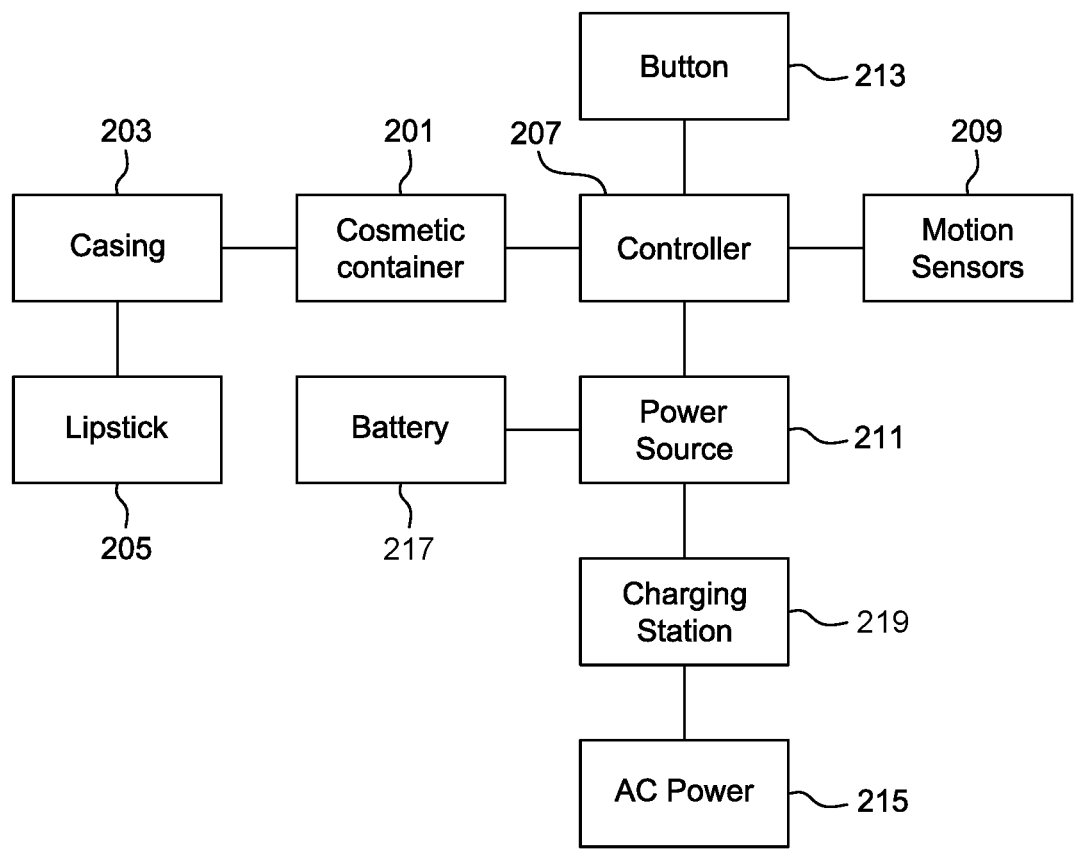
FIG. 2 is a schematic representation of an alternative cosmetic container in accordance with one or more embodiments of the present invention.

In FIG. 2, a schematic representation of an alternative cosmetic container 201 is depicted. As shown, the cosmetic container 201 includes a casing 203 configured to house a lipstick 205 therein. It should be appreciated that the lipstick 205 can be made of any material including, without limitation, pigments (iron oxides, ultramarine, mica, chromium dioxide, etc.), waxes (microcrystalline, beeswax, polyethylene, carnauba, etc.), oils (e.g., petrolatum, lanolin, cocoa butter, jojoba, castor, mineral, etc.), and the like.

The cosmetic container 201 also includes a controller 207 in electronic communication with one or more motion sensors 209, a power source 211, and a button 213. The controller 207 is configured to execute code or instructions to perform the operations and functionality described herein and to perform calculations and generate commands. It should be appreciated that the controller 207 can be a general-purpose processor, a microprocessor, a reconfigurable processor, a microcontroller, any other processing unit, or any combination or multiplicity thereof.

The one or more motion sensors 209 can be based on passive infrared technology, ultrasonic technology, microwave technology, tomographic technology, other motion detection technology, or a combination or multiplicity thereof.

The power source 211 is configured to supply electrical energy to the cosmetic container 201. The power source 211 can be a battery 217 that is rechargeable. In addition, the battery 217 can be recharged through a charging station 219 that is in direct connection to an alternating current (AC) power 215. It should be appreciated that the charging station 219 can recharge the battery 217 via a wired connection, wireless connection, or both.

The button 207 is configured to allow the cosmetic container 201 to open and close when a user presses onto the button 207.

It should be appreciated that the cosmetic container 201 may vary based on aesthetical, functional, or manufacturing considerations. For example, the cosmetic container 201 may have any suitable shape, including rectangular, square, triangular, linear, oval, or other appropriate geometry. In addition, the cosmetic container 201 may be made from any suitable material such as plastics, metals, woods, other materials, or a combination or multiplicity thereof. In another example, the cosmetic container 201 may include different colored materials and/or different colored patterns, images, and the like.

It should also be appreciated that during use, when the cosmetic container 201 is in a closed configuration, a user can activate the one or more sensors 105 by waving their hand thereover which causes the cosmetic container 101 to advance into an open configuration. The user can then activate the one or more sensors 105 again by waiving their hand thereover which causes the cosmetic container 101 to advance back into the closed configuration.

Further, it should be appreciated that one of the unique features believed characteristic of the present application is the use of one or more motion sensors to cause a cosmetic container to open and close automatically.

Figure 3:
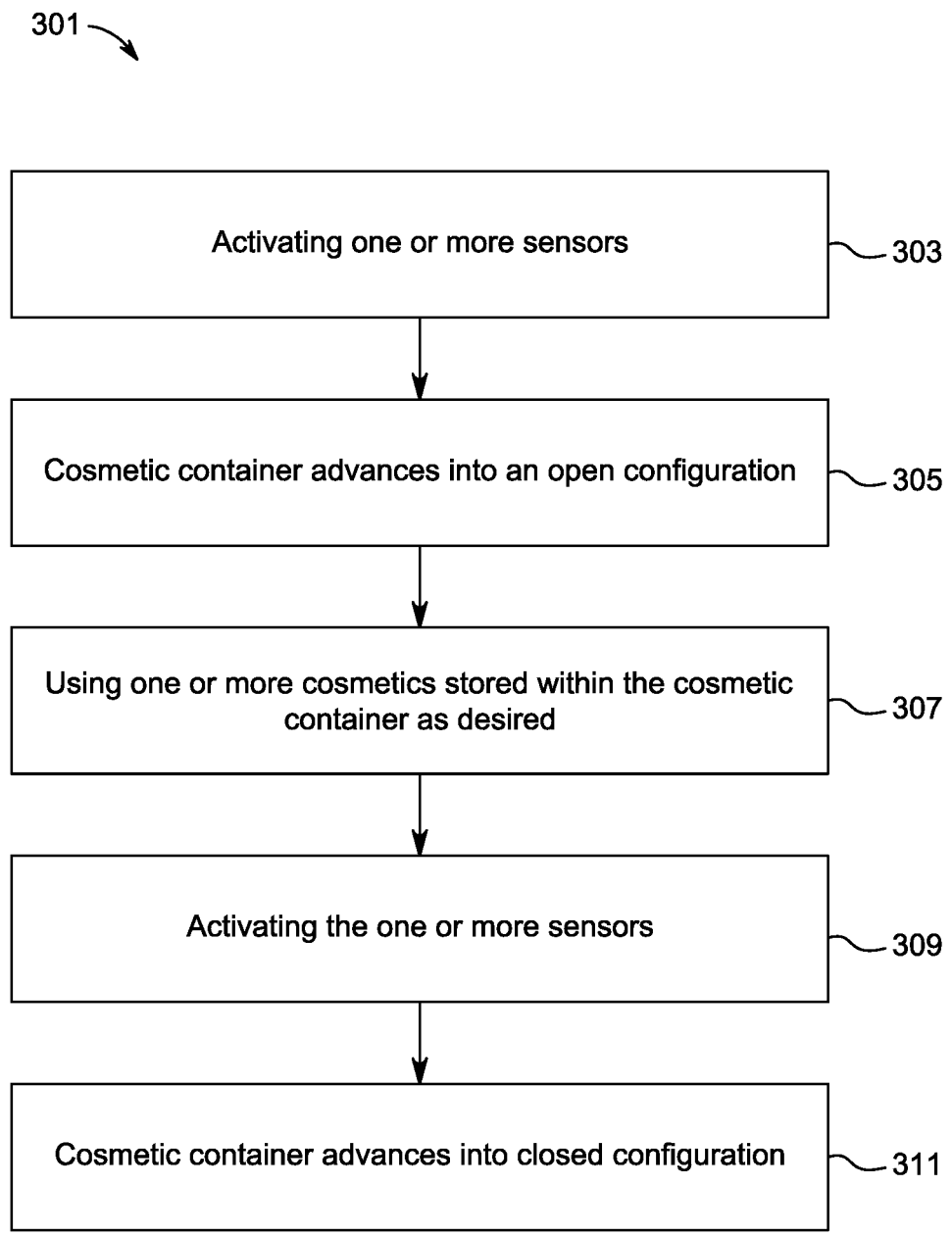
FIG. 3 is a flowchart of a method of operation in accordance with the present invention.

In FIG. 3, a flowchart 301 depicts a simplified method of operation of a cosmetic container. During use, when the user activates one or more sensors, the cosmetic container advances into an open configuration, as shown with boxes 303, 305. The user may then utilize one or more cosmetics stored within the cosmetic container as desired, as shown with box 307. When finished, the user may activate the one or more sensors to cause the cosmetic container to advance into a closed configuration, as shown with boxes 309, 311.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cosmetic container capable of touchless opening and closing, comprising:
    a controller in electronic communication with one or more motion sensors, a power source, and a button;

a plurality of compartments;
a plurality of hinges to allow the cosmetic container to pivot into an open and closed configuration;
a handle; and
a lock having a corresponding key;
wherein, upon activation, the one or more sensors allow the cosmetic container to advance into an open and closed configuration; and
wherein, upon pressing, the button allows the cosmetic container to advance into an open and closed configuration.

2. The cosmetic container of claim 1, wherein the plurality of compartments includes a plurality of pans configured to hold a plurality of eyeshadows.

3. The cosmetic container of claim 1, wherein the power source is a rechargeable battery.

4. The cosmetic container of claim 3, wherein the rechargeable battery is recharged wirelessly.

5. A cosmetic container capable of touchless opening and closing, comprising:
a casing configured to house a lipstick therein; and
a controller in electronic communication with one or more motion sensors, a power source, and a button;
wherein, upon activation, the one or more sensors allow the cosmetic container to advance into an open and closed configuration; and
wherein, upon pressing, the button allows the cosmetic container to advance into an open and closed configuration.

6. The cosmetic container of claim 5, wherein the power source is a rechargeable battery.

7. The cosmetic container of claim 6, wherein the rechargeable battery is recharged wirelessly.

8. A method of touchless opening and closing a cosmetic container, the method comprising:
providing a cosmetic container, the cosmetic container comprising:
a controller in electronic communication with one or more motion sensors, a power source, and a power switch;
a plurality of compartments;
a plurality of hinges to allow the cosmetic container to pivot into an open and closed configuration;
a handle; and
a lock having a corresponding key;
wherein, upon activation, the one or more sensors allow the cosmetic container to advance into an open and closed configuration; and
wherein, upon pressing, the button allows the cosmetic container to advance into an open and closed configuration;
activating the one or more motion sensors;
allowing the cosmetic container to automatically open;
reactivating the one or more motion sensors; and
allowing the cosmetic container to automatically close.

9. The method of claim 8, wherein the plurality of compartments further comprises of a plurality of pans configured to hold a plurality of eyeshadows.

10. The method of claim 8, wherein the power source is a rechargeable battery.

11. The method of claim 10, wherein the rechargeable battery is recharged wirelessly.

* * * * *